(12) United States Patent
Miles et al.

(10) Patent No.: US 9,358,806 B2
(45) Date of Patent: Jun. 7, 2016

(54) LASER REACTIVE MEDIA AND APPARATUS AND METHOD FOR WRITING AN IMAGE ONTO SUCH MEDIA

(71) Applicant: Fortium Technologies Ltd., Bridgend (GB)

(72) Inventors: Anthony Miles, Bridgend (GB); Robert Glyn Miles, Bridgend (GB)

(*) Notice: Subject to any disclaimer, the term of this patent is extended or adjusted under 35 U.S.C. 154(b) by 0 days.

(21) Appl. No.: 13/932,589

(22) Filed: Jul. 1, 2013

(65) Prior Publication Data

US 2014/0192130 A1    Jul. 10, 2014

Related U.S. Application Data

(63) Continuation of application No. 12/602,431, filed as application No. PCT/GB2008/000181 on May 29, 2008, now abandoned.

(51) Int. Cl.

| | | |
|---|---|---|
| *B41J 2/525* | (2006.01) | |
| *G11B 7/0037* | (2006.01) | |
| *B41J 2/44* | (2006.01) | |
| *G11B 7/24094* | (2013.01) | |
| *G11B 23/40* | (2006.01) | |
| *B41J 2/455* | (2006.01) | |
| *G11B 7/007* | (2006.01) | |
| *G11B 7/09* | (2006.01) | |
| *G11B 7/24* | (2013.01) | |

(52) U.S. Cl.
CPC .................. *B41J 2/442* (2013.01); *B41J 2/455* (2013.01); *B41J 2/525* (2013.01); *G11B 7/0037* (2013.01); *G11B 7/24094* (2013.01); *G11B 23/40* (2013.01); *G11B 7/00736* (2013.01); *G11B 7/0938* (2013.01); *G11B 7/24* (2013.01)

(58) Field of Classification Search
USPC .................................................. 347/237, 247
See application file for complete search history.

(56) References Cited

U.S. PATENT DOCUMENTS

| | | | |
|---|---|---|---|
| 3,259,047 A | | 7/1966 | Elliot et al. |
| 3,474,457 A | * | 10/1969 | Becker .......................... 347/249 |
| 4,333,715 A | | 6/1982 | Brooks |
| 4,697,284 A | * | 9/1987 | Glance .......................... 398/204 |
| 6,202,550 B1 | | 3/2001 | Lee et al. |

(Continued)

FOREIGN PATENT DOCUMENTS

| | | |
|---|---|---|
| EP | 1566803 A2 | 8/2005 |
| EP | 2419792 B1 | 3/2014 |

(Continued)

OTHER PUBLICATIONS

Office Action received for Chinese Patent Application No. 200980109307.2, mailed on Feb. 22, 2012, 8 pages(4 pages of English Translation and 4 pages of Official).

(Continued)

*Primary Examiner* — Huan Tran
(74) *Attorney, Agent, or Firm* — Garrett IP, LLC (57) ABSTRACT

An optical disk label writing method for writing a label on an optical disc uses a similar writing operation to that used to write data to the disc. The disc has a label side including a laser reactive material for forming the label image, and a tracking format that can be tracked by a writing laser in a similar way to a writing operation. A computer program is provided for converting a label image to a disk image file for writing to the label side.

29 Claims, 6 Drawing Sheets

(56) References Cited

U.S. PATENT DOCUMENTS

| | | | |
|---|---|---|---|
| 6,778,205 | B2 | 8/2004 | Anderson et al. |
| 7,166,420 | B2 | 1/2007 | Chopra et al. |
| 7,558,169 | B2 | 7/2009 | Morishima |
| 8,059,937 | B2 | 11/2011 | Basile et al. |
| 2002/0162058 | A1 | 10/2002 | Sinquin et al. |
| 2003/0145181 | A1 | 7/2003 | Bae |
| 2003/0161224 | A1 | 8/2003 | Anderson et al. |
| 2003/0179679 | A1* | 9/2003 | Morishima ............... 369/108 |
| 2004/0047249 | A1 | 3/2004 | Lee et al. |
| 2005/0243689 | A1 | 11/2005 | Van Brocklin et al. |
| 2006/0132585 | A1 | 6/2006 | Van Brocklin et al. |
| 2006/0228515 | A1 | 10/2006 | Kwasny et al. |
| 2007/0003847 | A1 | 1/2007 | Chopra et al. |
| 2007/0024695 | A1 | 2/2007 | Van Brocklin et al. |
| 2007/0053260 | A1 | 3/2007 | Reckless et al. |
| 2007/0065623 | A1 | 3/2007 | Kasperchik et al. |
| 2008/0311496 | A1 | 12/2008 | Iftime et al. |
| 2009/0040892 | A1 | 2/2009 | Hasebe et al. |
| 2010/0277561 | A1 | 11/2010 | Miles et al. |
| 2011/0122752 | A1 | 5/2011 | Miles et al. |
| 2012/0129096 | A1 | 5/2012 | Miles |

FOREIGN PATENT DOCUMENTS

| | | | |
|---|---|---|---|
| GB | 2414338 | A | 11/2005 |
| GB | 2469535 | B | 10/2013 |
| JP | 7-61146 | A | 3/1995 |
| JP | 2003-131339 | A | 5/2003 |
| JP | 2003-241338 | A | 8/2003 |
| JP | 2003-272240 | A | 9/2003 |
| WO | 00/74053 | A1 | 12/2000 |
| WO | 02/059881 | A1 | 8/2002 |
| WO | 03/034424 | A2 | 4/2003 |
| WO | 03/077246 | A2 | 9/2003 |
| WO | 2004/109681 | A2 | 12/2004 |
| WO | 2004/109696 | A1 | 12/2004 |
| WO | 2005/081245 | A2 | 9/2005 |
| WO | 2006/049751 | A1 | 5/2006 |
| WO | 2006/049752 | A1 | 5/2006 |
| WO | 2006/067405 | A1 | 6/2006 |
| WO | 2006/129231 | A1 | 12/2006 |
| WO | 2007/037238 | A1 | 4/2007 |
| WO | 2008/005184 | A2 | 1/2008 |
| WO | 2008/145992 | A2 | 12/2008 |
| WO | 2010/119269 | A3 | 1/2011 |

OTHER PUBLICATIONS

Applicant's Response to Office action for European Patent Application No. 10724886.6, filed Sep. 2, 2013, 9 pages.

Office action received for European Patent Application No. 10724886.6 mailed on Mar. 15, 2013, 4 pages.

Applicant's First Amendment for European Patent Application No. 10724886.6, filed on Sep. 25, 2012, 11 pages.

Communication pursuant to Article 94(3) EPC received for European Patent Application No. 09709456.9, mailed on Apr. 16, 2012, 4 pages.

Communication pursuant to Article 94(3) EPC received for European Patent Application No. 09709456.9, mailed on Dec. 12, 2012, 4 pages.

Combined Search and Examination Report received for United Kingdom Patent Application No. GB0802752.6, mailed Mar. 19, 2008, 8 pages.

Fourth Examination Report received for United Kingdom Patent Application No. GB0802752.6, mailed on Feb. 20, 2012, 3 pages.

Second Examination Report received for United Kingdom Application No. GB0802752.6 mailed on Jul. 16, 2010, 4 pages.

Third Examination Report received for United Kingdom Application No. GB0802752.6, mailed on Mar. 15, 2011, 3 pages.

First Examination Report received for United Kingdom Application No. GB0803946.3, mailed on Feb. 20, 2012, 5 pages.

Search Report received for United Kingdom Application No. GB0803946.3, mailed on Mar. 20, 2008, 5 pages.

Search Report received for United Kingdom Patent Application No. GB0908946.7, mailed on Sep. 22, 2009, 2 pages.

Office action received for United Kingdom Patent Application No. GB0908946.7, mailed on Apr. 29, 2013, 3 pages.

Decision to Grant for United Kingdom Patent Application No. GB2469535, mailed on Sep. 10, 2013, 2 pages.

Applicant's Amendment Filed for United Kingdom Patent Application No. 0908946.7, filed on Aug. 30, 2013, 6 pages.

International Search Report received for PCT Patent Application No. PCT/GB2010/000780, mailed on Nov. 16, 2010, 4 pages.

International Search Report and Written Opinion received for PCT Patent Application No. PCT/GB2008/001814, mailed on Feb. 4, 2009, 20 pages.

International Preliminary Report on Patentability received for PCT Patent Application No. PCT/GB2008/001814, issued on Dec. 1, 2009, 11 pages.

Office Action received for Japanese Patent Application No. 2012-505230, mailed on May 20, 2014, 3 pages(English Translation only).

* cited by examiner

LASER REACTIVE MEDIA AND APPARATUS AND METHOD FOR WRITING AN IMAGE ONTO SUCH MEDIA

The present invention relates to laser reactive media, particularly to optical discs with writable labels, and means for printing on such media.

BACKGROUND TO THE INVENTION

Writable optical discs are widely used for the storage of data, such as audio, video or photographic images. Many users have a large collection of such data on multiple optical discs, and need to identify the content of each disc. This can be done by marking the non-writable side of a single sided disc with a marker pen, but this can damage the disc and may not provide a very clear or attractive label.

Another approach is to print a label of the same shape and size as the optical disc using a separate printer, and to affix the printed label to the optical disc. Printable label media may be used for this purpose, together with software for designing the label. However, the label may become detached from the disc, or may become partially detached and jam an optical disc drive.

U.S. Pat. No. 6,074,031 describes, an optical disk drive including an inkjet print head, so that the drive can print, a label on a disk as well as read or write data to or from the disc. However, this would lead to a very complex and expensive drive that would be prone to failure.

U.S. Pat. No. 6,771,297 describes a system for writing an optical disc label using a laser, possibly the same laser that is used to write data to the optical disc, and a thermally sensitive layer on the label side of the disc. A similar system is currently available on the market under the Hewlett-Packard Lightscribe™ brand. The Lightscribe™ system requires a Lightscribe-enabled optical drive, and it is not possible to write labels on Lightscribe discs with non-Lightscribe-enabled drives. Furthermore, the Lightscribe system is only able to write labels in monochrome; a colour version is disclosed in U.S. Pat. No. 6,771,297, but is not available on the market. Most importantly, the Lightscribe system requires 20 to 40 minutes to write the label, which is considerably longer than the time taken to write data to the disc.

STATEMENT OF THE INVENTION

According to one aspect of the present invention, there is provided an optical disc label writing method for writing a label on an optical disc using a similar writing operation to that used to write data to the disc. The disc has a label writing side including a laser reactive material for forming the label image, and a tracking format that can be tracked by a writing laser in a similar way to a writing operation. Hence, according to another aspect of the invention, there is provided an optical disc having a laser-reactive label writing side carrying a tracking format.

Since the label writing side appears to the optical disc drive as a standard data-writable disc, a label may be written on the disc using a standard optical disc writing drive. However, software is required to convert a label image to a data file suitable for writing to the optical disc. Hence, according to another aspect of the invention there is provided a computer program arranged to convert an image for an optical disc label into one or more data files suitable fir writing to an optical disc.

The label side may not be capable of storing the data that the optical drive attempts to write in a data writing operation; however, as far as the optical drive is concerned, the writing operation may be substantially the same as a data writing operation. However, a visible label image is written instead of data readable by the optical drive.

According to a further aspect of the present invention, there is provided an optical disk label writing apparatus and method for writing a label en an optical disc using a writing operation different and separate to that used to write data to the disc. The disc has a label writing side including as laser reactive material for forming the label image, and a laser writing print head emitting at least two laser beams from an array is used to write an image on the label writing side of the disc.

According to a further aspect of the present invention, there is provided an apparatus and method for writing an image to a laser reactive medium where the laser reactive material exhibits different reactions depending on the frequency of laser light received. A laser writing head is arranged to heterodyne the outputs of at least two laser generating devices to generate a range of discrete frequencies of laser light. The laser writing head is operable to supply to the laser reactive material a selected one or more frequencies of laser light from the range of discrete frequencies of laser light produced by heterodyning.

According to a further aspect of the present invention, there is provided an apparatus and method for writing an image to a laser reactive medium, where the laser reactive medium has one or more laser reactive layers, each layer having a different colour. The laser reactive medium is able to vaporise when illuminated by a laser beam. A laser writing head is operable to emit a laser beam to vaporise portions of the laser reactive material. A colour recognising sensor may be provided to monitor the colour of the laser reactive medium and de-energise the laser beam when a desired colour is obtained.

BRIEF DESCRIPTION OF THE DRAWINGS

Embodiments of the invention will now be described with reference to the drawings identified below.

DETAILED DESCRIPTION OF EMBODIMENTS OF THE INVENTION

First Embodiment

Figure 1:
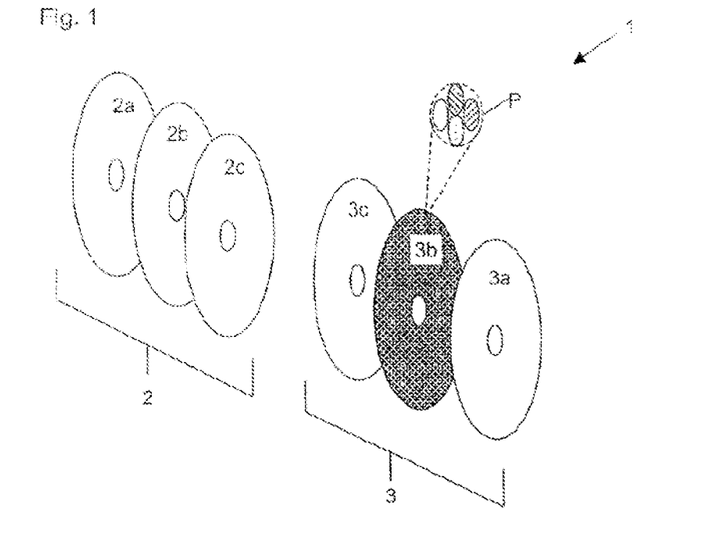
FIG. 1 shows the construction of an optical disc in an embodiment of the invention.

As shown in FIG. 1, an optical disc 1 in a first embodiment of the invention has a data side 2 and a label side 3. The data side 2 is arranged to store data written thereto by an optical disc drive; it comprises, in order from the outer surface of the optical disc 1 inwards: a substrate 2a carrying a spiral track; a data writing layer 2b that stores data written thereto; and a reflective layer 2c for reflecting the laser of the optical disc drive so as to enhance its effect on the data writing layer 2b. The label side 3 is arranged to carry a visible pattern written thereto by the optical disc drive; it comprises in order from the outer surface of the optical disc 1 inwards: a substrate 3a carrying a spiral track; a label writing layer 3b; and a reflective layer 3c for reflecting the laser of the optical disc drive so as to enhance its effect on the label writing layer 2b.

During construction of the disc 1, the different layers 2a to 2c and 3a to 3c are integrated to form the optical disc 1.

The label writing layer 3b comprises an array of pixels P, each comprising a pattern of dots of different writing colours: in this case red, green, blue and black. Each dot comprises a material that reacts to the laser of the optical disc drive by changing from a base colour (e.g. white or colourless) to the writing colour. Preferably, this colour change is irreversible or permanent. The pixels P are distributed substantially evenly over the writable surface of the label writing layer 3b. The pixels P may be deposited by printing onto the inner side of the substrate 3a, or by another forming or depositing method.

The dots may be formed from one or more laser-writable inks, for example as disclosed in WO-A-05/068207. Any suitable laser reactive material may be used to form the dots, examples include:

Cyanine, which is a non-systematic name of a synthetic dye family with the common molecular formula:

ArN+=CH[CH=CH]n=NAr where two quaternized nitrogens are joined by a polymethane chain. Both nitrogens are each independently part of a heteroaromatic moiety, such as imidazole, pyridine, pyrrole, quinoline, thiazole, etc.

Leuco dyes

Thermochromic dyes are based on mixtures of Leuco dyes with suitable other chemicals, displaying a color change (usually between the colourless Leuco form and the coloured form) independent of temperature. The dyes are rarely applied on materials directly; they are usually in the form of microcapsules with the mixture sealed inside. An illustrative example is where microcapsules with crystal violet lactone, weak acid, and a dissociable salt dissolved in dodecanol are applied to a substrate; when the solvent is solid, the dye exists in its lactone leuco form, while when the solvent melts, the salt dissociates, the pH inside the microcapsule lowers, the dye becomes protonated, its lactone ring opens, and its absorption spectrum shifts drastically, therefore it becomes deeply violet. In this case the apparent thermochromism is in fact halochromism.

Azobenzene

The wavelengths at which isomerization occurs depends on the particular structure of each azo molecule, but they are typically grouped into three classes: the azobenzene-type molecules, the aminoazobenzenes, and the pseudo-stilbenes. These azos are yellow, orange, and red, respectively, owing to the subtle differences in their electronic absorption spectra. The compounds similar to the unsubstituted azobenzene exhibit a low-intensity n-p* absorption in the visible region, and a much higher intensity p-p* absorption in the ultraviolet. Azos that are ortho- or para-substituted with electron-donating groups (such as aminos), are classified as aminoazobenzenes. The pseudo-stilbene class is characterized by substituting the 4 and 4' positions of the two azo rings with electron-donating and electron-withdrawing groups (that is, the two opposite ends of the aromatic system are functionalized). The addition of this push-pull configuration results in a strongly asymmetric electron distribution, which modifies a host of optical properties. In particular, it shifts the absorption spectra of the trans and the cis isomers, so that they effectively overlap. Thus, for these compounds a single wavelength of light in the visible region will induce both the forward and reverse isomerization. Under illumination, these molecules cycle between the two isomeric states.

Diazonium

Diazonium salts are light sensitive and break down under near UV or violet light. This property has led to their use in document reproduction. In this process, paper or film is coated with a Diazonium salt. After contact exposure under light, the residual Diazo is converted to a stable Azo dye with an aqueous solution of coupler.

Other typical substances that are photosensitive are metallic salts, alkali salts and certain halides.

The list of laser/light reactive materials outlined above is not intended to be limiting, US 20060241225 describes in further detail suitable laser activated thermochromic compositions that could be used to form the dots of this first preferred embodiment. In US 20060241225A, the thermochromic compositions comprise a binder polymer, a thermochromic dye and a stabilizer. The composition is responsive to exposure to a laser beam by undergoing an irreversible colour change. The laser reactive colour changing properties of the compounds used in the first preferred embodiment will consist of a unique compound manufactured from several of the available materials, including polymers and other materials as required, to suit the requirement of the substrate used in the particular embodiment.

The substrates 2a and 3a, which may be of polycarbonate, each carry a spiral track that is tracked by the reading and writing mechanism of the optical drive so as to align the laser correctly. The spiral track may be embossed on the inner sides of the substrates 2a, 3a. Conventional optical discs carry such a track on their data sides. However, the optical disc of this embodiment differs from conventional optical discs by having a similar track on the label side 3.

The substrates 2a, 3a also carry control data in a format that can be read by an optical disc drive, to convey data about the optical disc. They may further carry data identifying the manufacturer of the disc.

The data side 2 is compliant with an optical disc standard, and preferably a writable optical disc standard, such as the minidisk, CD-R, CD-RW, DVD-R, DVD+R, DVD+RW, DVD-RW, DVD-RAM, HD DVD-R, HD DVD-RAM, BD-R or BD-RE standards.

The label side 3 may be compliant with an optical disc standard in so far as is detectable by an optical disc complying with that standard, during a write operation. Hence, the substrate 3a may comply with that standard. However, the label writing layer 3b need not comply with any optical disc data standard, as it is not intended that the label is readable by the optical disc drive, but rather that it is visible to a user. The standard of the label side 3 need not be the same standard as that of the data side 2, but preferably both standards are supported by the same optical drive.

Figure 2:
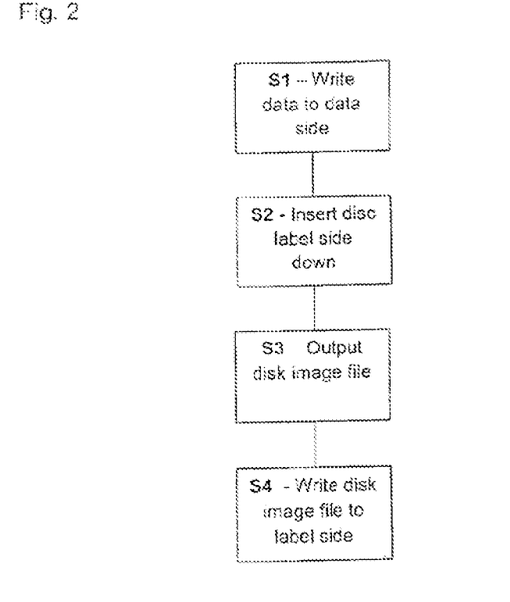
FIG. 2 is a flowchart of a method of writing a label in an embodiment of the invention.

A method of operation according to an embodiment of the invention will now be described with reference to FIG. 2. First, the optical disc 1 is inserted into an optical disc drive with the label side 3 facing upwards, and data is written to the data side 2 (step S1). Next, the optical disc 1 is removed from the optical drive and replaced in the optical drive with the label side 3 facing downwards (step S2). The user then outputs one or more data files to the optical disc drive (step S3). The drive reads the control information on the label side 3 and thereby identifies the label side 3 as being writable and conforming to the relevant standard. The drive then writes the one or more data files to the label side 3 (step S4), following the track on the substrate 3a.

The writing operation of the drive on the label side 3 causes the laser of the drive to selectively excite the dots of the pixels P according to the data content and format of the one or more data files. Each dot is preferably substantially larger than the pitch of the spiral track in a radial direction, and is preferably substantially larger than the writing resolution of the laser in the circumferential direction. The laser may therefore be controlled according to the one or more data files to excite a predetermined proportion of the area of each dot, so as to generate a desired intensity of each dot. In this way, a colour label may be created with high colour resolution; in other words, each pixel P may have any of a wide range of colours and intensities.

In one preferred embodiment, the label writing layer 3b includes periodic gaps in the radial direction, containing no pixels P. In one example, 1 in every 45 tracks in the radial direction carries no pixels. This feature allows the automatic error correction of the optical drive to function correctly, even after the label is written. The gap is preferably sufficiently intermittent that it does not materially affect the appearance of the label.

The step of outputting the one or more data files (step S3) may include executing a software application to convert a label design, such as an image file, into the one or more data files suitable for writing by the optical drive. The software application may provide a user interface allowing the user to create the label design. Preferably, the application restricts the design to the colours, intensities and shape that can be written to the label writing layer 3b, either during creation of the design or after completion of the design.

Once the design is complete, the application then converts the label design to the one or more data files, according to the standard to which the label side 3 apparently complies. For example, the standard may be a writable DVD standard, under which the relative positions of recorded data on a DVD are predictable from the content of a data file to be recorded. The one or more data flies preferably comprise a disk image file which represents both the content and layout of data to be recorded to a disc, such as an .iso file. The application may determine the relevant standard by reading the control data from the label side 3.

The application may output the disk image file for writing to the optical disc 1. Alternatively, the application may save the disk image file for subsequent output to the drive by another application. The disk image file may be distributed, subject to copyright, and used by others to write the label on other optical discs in accordance with the embodiment.

The application may be supplied on a writable disc according to an embodiment of the invention, preferably a rewritable optical disc such that the application can be loaded onto a computer and subsequently rewritten on the disc.

Second Embodiment

The optical drive of the first embodiment utilises a single writing laser to write data to a data writing layer of the optical disk and also to write images to a label writing layer of the optical disk. As an alternative approach, separate writing devices could be used to perform the two separate tasks. The writing means of the first embodiment can still be used to write data to the data writing layer of the optical disc but a second writing means can be used to write images to the label writing side of the optical disc. The second writing means can take the form of a laser writing print head and such a system will now be discussed below as a second preferred embodiment of the present invention.

Figure 3:
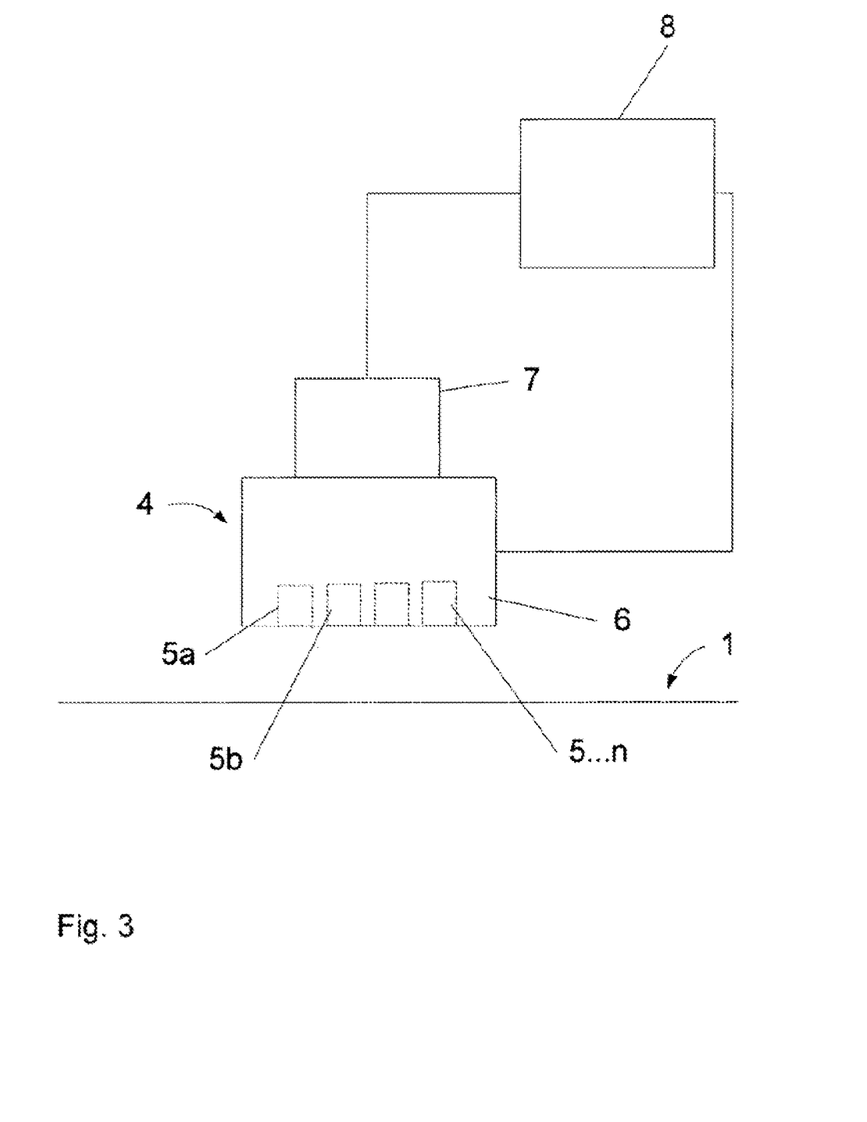
FIG. 3 shows a diagrammatic view of a laser writing print head according to a second embodiment of the invention.

According to the second preferred embodiment of the present invention, the laser-reactive printing media 9 is the optical disc 1, and more specifically the label writing layer 3b, and the laser writing print head is used to write images/patterns on the label writing layer 3b of the optical disc 1 using a method similar to that discussed in relation to the second embodiment. In this case however, the laser writing print head is transported in the radial direction of the optical disc 1 by the print head transport system 7 whilst the optical disc 1 spins in the circumferential direction beneath the laser writing print head. In contrast to the optical drive according to the first embodiment, the laser writing print head will only write data to the label writing layer 3b of the optical disc 1 and so a further data writing subsystem is required to write data to the data writing layer 2b of the optical disc 1.

Figure 4:
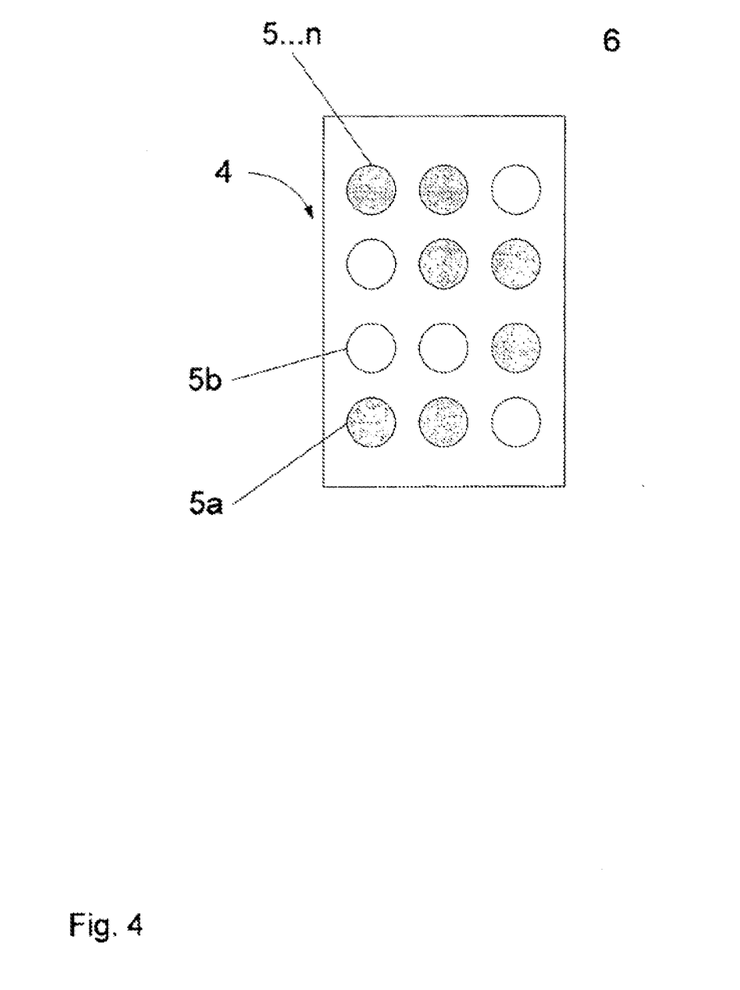
FIG. 4 shows a plan view of the laser writing print head of FIG. 3.

FIG. 3 shows a laser writing print head 4, consisting of a laser array in the form of a print head pattern, according to the second embodiment of the invention. Laser generating devices 5a, 5b, 5 . . . n are provided in a housing module 6. FIG. 4 shows a plan view of the arrangement of the laser generating devices 5a, 5b, 5 . . . n showing that they are arranged to form a rectangular array although the arrangement of the laser generating devices is not limited in this respect and any other suitable arrangement could be used.

The output from each laser generating device 5a, 5b, 5 . . . n, may be through an aperture in the housing module 6 of any shape but in a preferred embodiment the apertures is circular. Each laser generating device 5a, 5b, 5 . . . n is able to direct generated laser light through its respective aperture so that laser light is emitted from the housing module 6 and onto suitable laser-reactive printing media 9 which preferably is the label writing layer 3b of the optical disc 1 as discussed in relation to the first embodiment. The label writing layer 3b is positioned a small distance below the laser writing print head.

The laser writing print head is mounted on a print head transport system 7. The laser generating devices 5a, 5b, 5 . . . n and the print head transport system 7 are electrically connected to a control module 8. The laser writing print head is transported in a first direction by the print head transport system 7, whilst the suitable laser-reactive printing media 9 is transported below the laser writing print head, in a direction generally orthogonal to the direction of travel of the laser writing print head. In this preferred embodiment, the suitable laser-reactive printing media 9 is the label writing layer 3b of the optical disc 1 and the laser writing print head is transported in the radial direction of the optical disc 1 by the print head transport system 7 whilst the optical disc 1 spins in the circumferential direction beneath the laser writing print head by disc spinning means in the optical drive.

The laser generating devices 5a, 5b, 5 . . . n are energised by the control module 8 such that their laser light falls onto the label writing layer 3b of the optical disc 1 at the correct position in the X and Y co-ordinates.

The laser-reactive material used in the label writing layer 3b of the optical disc 1 may be selected from the same material as discussed in relation to the first embodiment and has the significant feature that it will react specifically to the laser light of the laser generating devices 5a, 5b, 5 . . . n. A single laser reactive material may be applied uniformly across the label writing layer 3b of the optical disc 1 if monochrome images are required. Alternatively, a pattern of dots may be distributed evenly across label writing layer 3b forming a pattern of dots of different writing colours: in this ease red, green, blue and black, as discussed in relation to the first embodiment. Each dot comprises a material that reacts to the laser light of the laser generating devices 5a, 5b, 5 . . . n by changing from a base colour (e.g. white or colourless) to the writing colour. Preferably, this colour change is irreversible or permanent.

In operation, one or more data files corresponding to images to be printed on the optical disc are sent via the control module 8 to the print head. The control module 8 converts the data files, via a similar software application to that discussed in relation to the first embodiment, into instructions that, when performed by the laser writing print head, result in a suitable output of the data file as an image onto the label writing layer 3b of the optical disc. The control module 8 controls the movement of the laser writing print head in the radial direction of the optical disc 1 whilst the optical disc is spun in the circumferential direction by disc spinning means. The control module 8 also controls the output of laser light from each laser generating device 5a, 5b, 5 . . . n in the housing module 6, by turning on and off each laser generating device 5a, 5b, 5 . . . n in a suitable pattern.

The laser light emitted by the laser generating devices 5a, 5b, 5 . . . n strikes the laser-reactive material of the label writing layer 3b at a location directly beneath each laser generating device 5a, 5b, 5 . . . n. If the laser-reactive material consists of distributed dots of laser reactive materials then the laser generating devices 5a, 5b, 5 . . . n may therefore be controlled according to the one or more data files to excite a predetermined proportion of the area of each dot, so as to generate a desired intensity of each dot. In this way, a colour label may be created with high colour resolution; in other words, each dot may have any of a wide range of colours and intensities. If only a single laser reactive material has been applied uniformly across the label writing layer 3b, a monochrome label may be created with a range of grayscales. In either method a pattern is produced on the label writing layer 3b beneath the laser writing print head that corresponds to the laser light output pattern from the laser generating devices 5a, 5b, 5 . . . n.

Third Embodiment

The writing operation of the optical drive discussed in relation to the first embodiment causes the laser of the drive to selectively excite material reactive to the laser light of the laser. In the first embodiment, the dots each have different colour change reactions in response to the laser light e.g. one dot may turn from white to red whilst another may turn from white to green.

Figure 5:
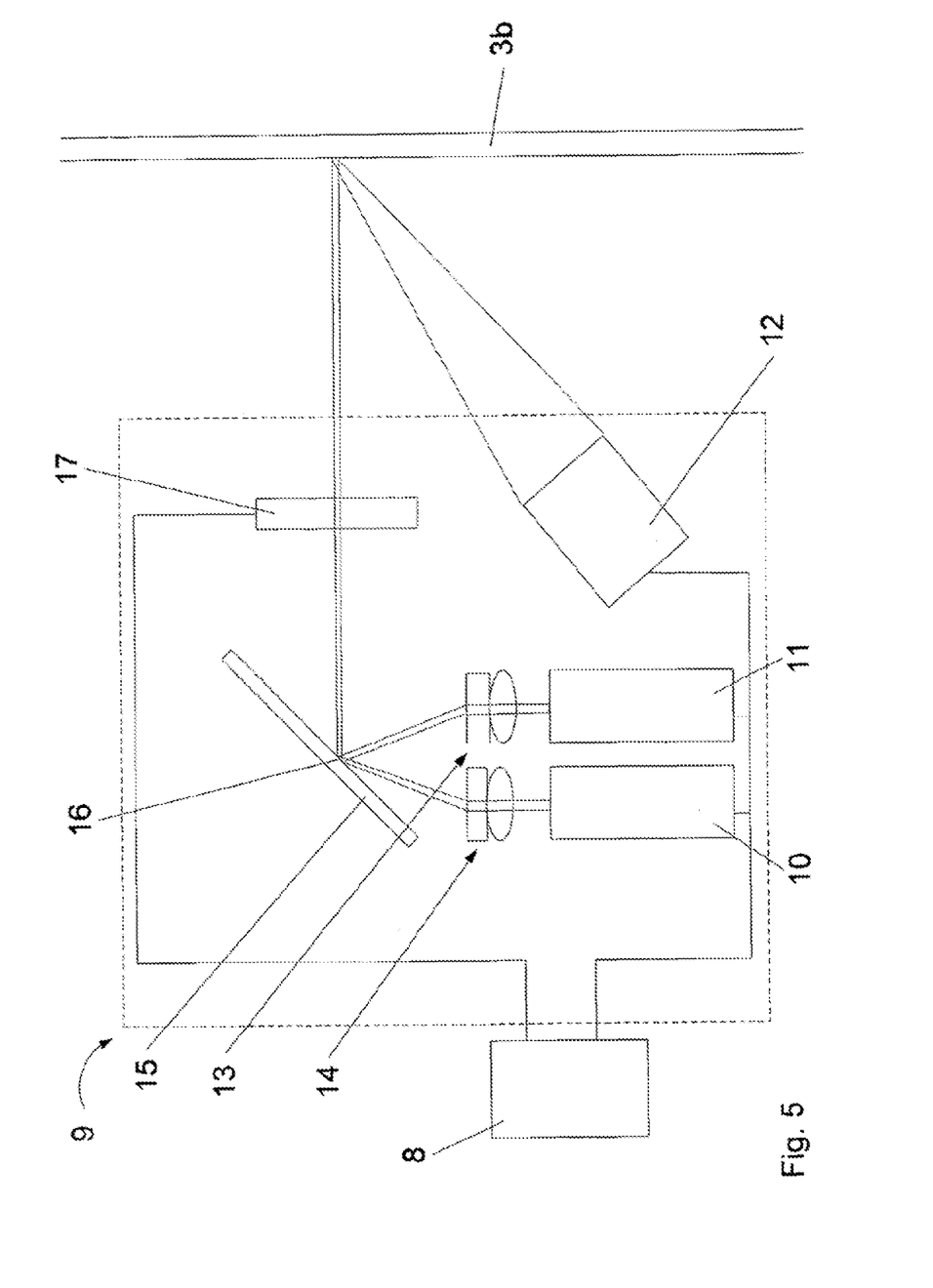
FIG. 5 shows a diagrammatic view of a laser writing head according to a third embodiment of the invention.

In this third embodiment, the label writing layer 3b comprises a laser reactive material that reacts to laser light by changing from a base colour (e.g. white or colourless) to a specific one of a range of writing colours, where the specific writing colour is dependent on the frequency of the laser light received. In a preferred embodiment, the material may change to any one of four colours depending on the frequency of the laser light received. If the laser reactive material receives a first frequency of laser light it will change from its base colour to black, if it receives a second frequency of laser light it will change from its base colour to magenta, if it receives a third frequency of laser light it will change from its base colour to yellow, and if it receives a fourth frequency of laser light it will change from its base colour to cyan. Preferably, this colour change is irreversible or permanent.

The laser reactive material may be formed from one or more laser-writable inks. The laser reactive material may be one of the materials discussed in relation to the first embodiment of the invention, or may be a different laser reactive material. In both cases, the laser reactive material will react only when excited by specific designated frequencies.

The material may be continuous or may comprise discrete pixels P distributed substantially evenly over the writable surface of the label writing layer 3b.

As shown in FIG. 5, rather than having a single laser to write information to the label layer 3b of the optical disc 1, a write head is formed by a movable assembly 9 containing two laser generating devices, 10, 11 and a colour recognising sensor 12. The movable assembly 9 is able to be moved over the surface of the label layer 3b in a similar manner to the writing laser of the first embodiment.

Each individual laser generating device 10, 11 can be selectively controlled to output laser light of a single fundamental frequency. The frequency of the laser light output by the first laser generating device 10 is different to the frequency of the laser light output by the second laser generating device 11. The output laser light from each laser generating device 10, 11, is passed through respective focussing and collimating lens assemblies 13, 14 arranged so that the laser beams can be collimated and then focussed on the same point. The collimated laser beams are focused at the same point, on a mirror 15. Heterodyning of the two optical signals occurs at their point of intersection 16 on mirror 15. Heterodyning, is a well known physical effect and will not be described in further detail here.

As a result of the heterodyning of the two optical signals, each of which has a different frequency, the resultant heterodyned optical signal reflected from the mirror 15 contains light at four frequencies that are, respectively:

1. the frequency of the laser light generated by the first laser generating device 10;
2. the frequency of the laser light generated by the second laser generating device 11;
3. the sum of the frequencies of the laser light generated by the first second laser generating devices 10, 11; and
4. the difference between the frequencies of the laser light generated by the first and second laser generating devices 10, 11.

The four frequencies of light generated by heterodyning the outputs of the first and second laser generating devices 10, 11 correspond to the first, second, third, and fourth frequencies of laser light that cause the material of the optical disc to change colour from its base colour to either black, magenta, yellow, or cyan (as discussed above).

A variable optical filter 17 is provided which receives and selectively filters the heterodyned optical signal reflected from the mirror 15. The variable optical filter 17 is adjustable and is arranged to allow only light having a specific frequency to pass through at any one time. The optical signal output from the variable optical filter 17 illuminates a portion of the optical disc.

The control module 8 of the optical drive is able to control the variable optical filter 17 so that only a selected one of the four frequencies of light contained in the heterodyned optical signal is allowed to pass through the variable optical filter 17 to illuminate the portion of the optical disc 1.

The variable optical filter 17 may comprise an optical splitter that is able to spatially separate optical signals of different frequencies, and a selectively controlled shutter array, aligned with the spatially separated optical signals. As the heterodyned optical signal passes through the optical splitter, the four optical signals therein, each having one of the frequencies discussed above, are diffracted by different amounts dependent on their frequency. Thus, four individual beams of laser light are output from the optical splitter, each beam separated from the others by a fixed distance. The shutters of the shutter array are aligned with these beams so that one shutter is centered in the beam path of each spatially separated laser beam. When a shutter is in an open position, its respective spatially separated laser beam is allowed to pass unhindered. When a shutter is in a closed position, its respective spatially separated laser beam is blocked. The control module 8 can control the individual shutters of the shutter array to produce any combination of open and closed individual shutters.

It can be seen therefore that the specific colour change of the material beneath the writing head is dependent on which one of the four frequencies of light contained within the heterodyned optical signal is allowed to activate the laser reactive material.

The colour recognising sensor 12 provided in the write head is focused on the portion of the optical disc 1 that has the selectively filtered optical signal applied to it. The colour recognising sensor 12 is able to detect and measure the colour change of the material.

In operation, the write head is moved to the required position over the label layer 3b of the optical disc 1 in a similar manner to that described in relation to the first embodiment. Once the write head is positioned at the required coordinates, the first and/or the second laser generating device 10, 11 is/are activated.

If only the first laser generating device 10 is energised, the laser beam so produced is collimated and focussed, by collimating and focussing assembly 14, onto the mirror 15. The laser beam is reflected from the mirror 15, through the variable optical filter 17 (which is selectively controlled by control module 8 to allow light having the frequency of the laser light generated by the first laser generating device 10 to pass through) and illuminates a portion of the optical disc 1.

If only the second laser generating device 11 is energised, the laser beam so produced is collimated and focussed, by collimating and focussing assembly 13, onto the mirror 15. The laser beam is reflected from the mirror 15, through the variable optical filter 17 (which is selectively controlled by control module 8 to allow light having the frequency of the laser light generated by the second laser generating device 11 to pass through) and illuminates a portion of the optical disc 1.

If both the first and second laser generating devices 10, 11 are energised, each respective laser beam so produced is collimated and focussed, by respective collimating and focussing assemblies 13, 14, onto a coincident point on the mirror 15. Heterodyning of the two optical signals occur at their point of intersection 16 on the mirror 15 and an optical signal containing the four frequencies outlined above is reflected from the mirror 15, to the variable optical filter 17. Control module 8 selectively controls the variable optical filter 17 to allow light having only one of the four frequencies to pass through. and illuminate a portion of the optical disc 1.

In each case, the material illuminated by the laser light output from the variable optical filter 17 changes to one of either black, magenta, yellow, or cyan depending on which of the four frequencies of light in the heterodyned optical signal it receives.

The colour recognizing sensor 12 monitors the colour change of the material as a result of the laser illumination and, when the material has turned to an appropriate colour as recognised by the colour sensor 12, the colour sensor 12 provides a signal to the control module 8 which, in turn, de-energises the or both laser generating devices 10, 11 and instructs a positioning mechanism to move the write head to the next writing position.

Fourth Embodiment

The image writing apparatus and method described in relation to the fourth embodiment is similar to the image writing apparatus, and the operation thereof, discussed in relation to the first embodiment.

Figure 6:
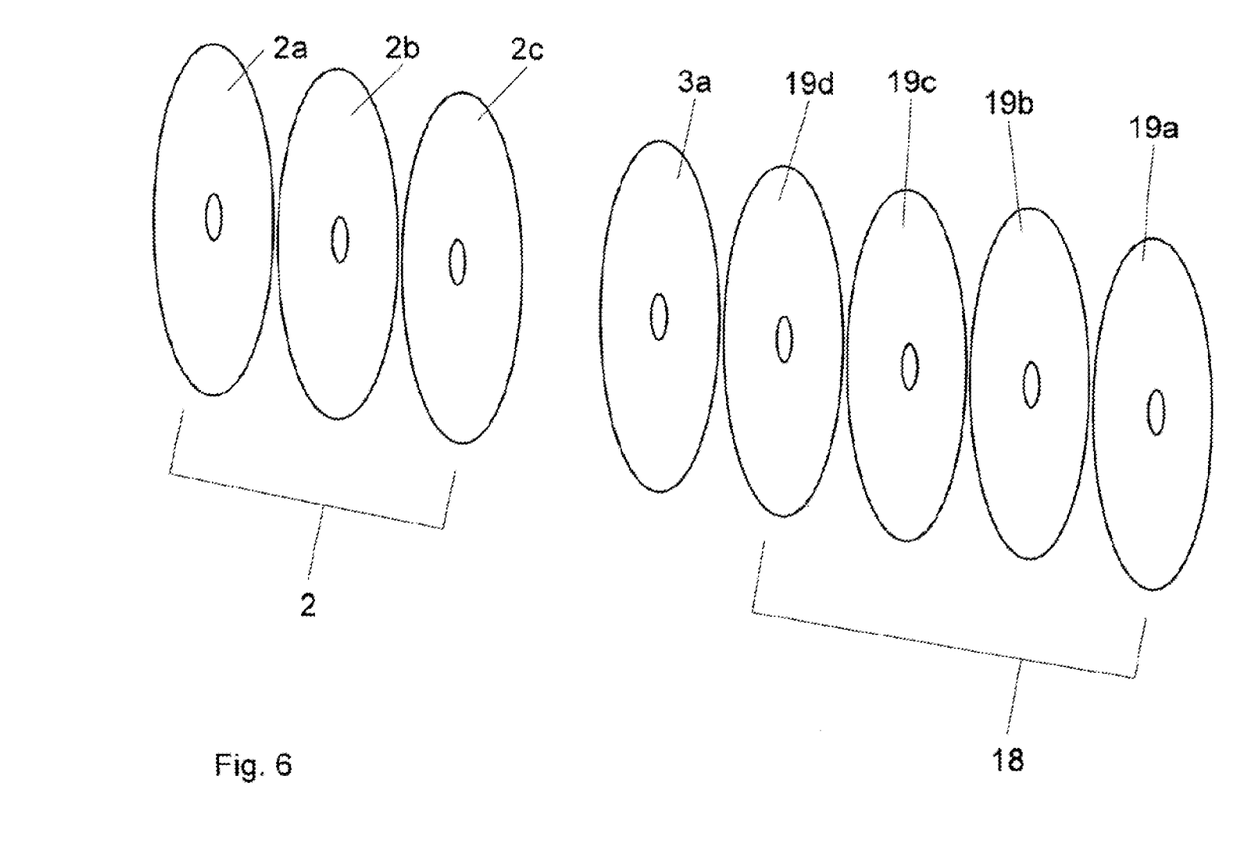
FIG. 6 shows the construction of an optical disc in a fourth embodiment of the invention.
Figure 7:
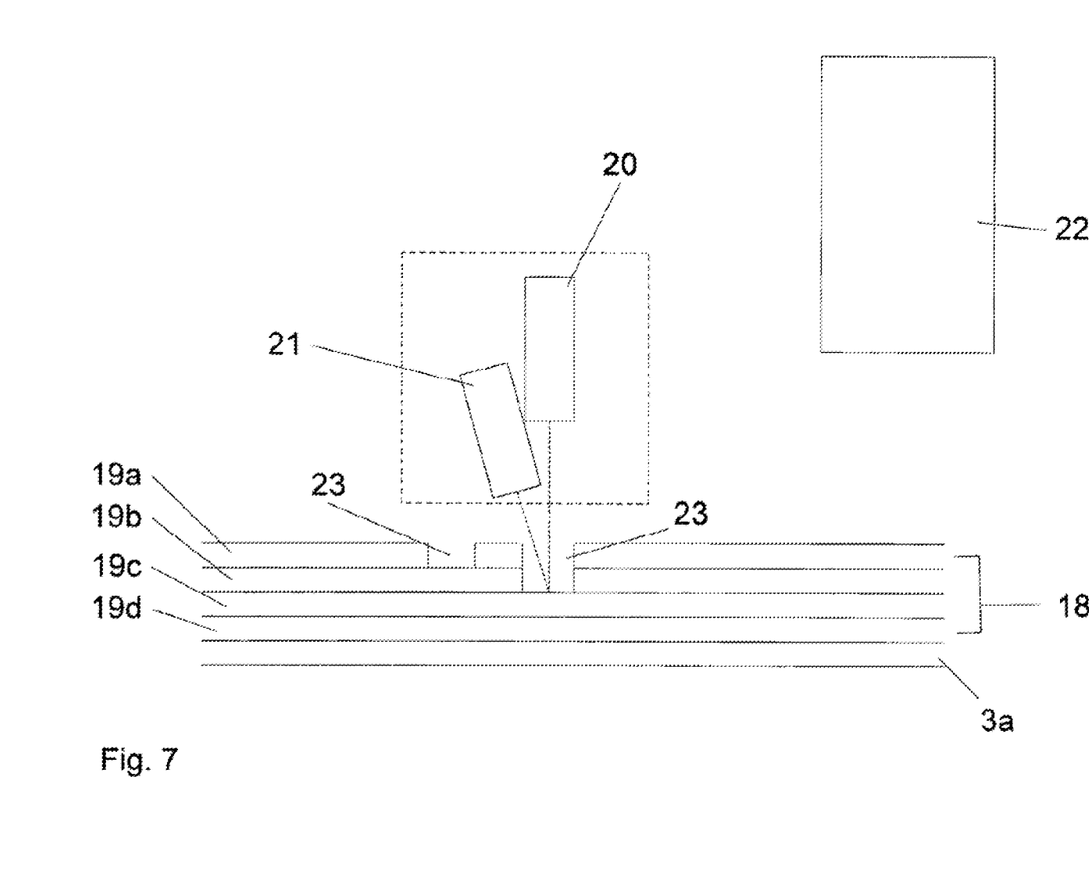
FIG. 7 shows a diagrammatic view of a laser writing head according to the fourth embodiment of the invention.

As shown in FIG. 6, the data side 2 of the optical disc 1 of the fourth embodiment is the same as that discussed in relation to the first embodiment but the arrangement of the label side 3 of the optical disc 1 is different. The label side is arranged to carry a visible pattern written thereto by the optical disc drive; it comprises a substrate 3a and a label writing layer 18 arranged above the substrate layer 3a. As shown in FIGS. 6 and 7, the label writing layer 18 comprises four coloured layers 19a, 19b, 19c, 19d, stacked one on top of the other. The four coloured layers 19a, 19b, 19c, 19d, in this preferred embodiment, are arranged in the following order as seen from the surface of the optical disc 1: a white layer 19a, a magenta layer 19b, a yellow layer 19c, and a cyan layer 19d. Each of these four coloured layers 19a, 19b, 19c, 19d is opaque so that the coloured layer 19a, 19b, 19c, 19d beneath another coloured layer is not visible. A writing head is provided comprising a writing laser 20 and a colour recognising sensor 21. The writing head is movable about the surface of the label side 3 of the optical disc 1, via control module 22 and positioning means (not shown in FIG. 7). The write position of the laser writing head is determined by the rotational position of the optical disc 1 and the radial position of the laser writing head. The drive motors for the rotational movements of the optical disc 1 and radial movements of the laser writing head, respectively, may be of the stepper motor type that will be controlled by software and/or control module 22 to effect positioning of the laser to the desired writing point.

The four coloured layers 19a, 19b, 19c, 19d comprise material that is thermally reactive to the laser light of the writing laser 20. When illuminated by the writing laser 20, the portion of the illuminated coloured layer 19a, 19b, 19c, 19d beneath and closest to the laser beam absorbs the energy of the laser beam and vaporises. A colour recognising sensor 21 is incorporated, into the optical drive and it is arranged so that it is able to detect any colour change seen on the label writing layer 18 of the optical disc 1 at the position illuminated by the laser beam of the optical drive.

In operation, the one or more data files corresponding to images to be printed on the optical disc 1 are sent via the control module 22 to the writing laser 20. The control module 22 controls the movement of the laser writing print head in the radial direction of the optical disc 1 whilst the optical disc is rotated in the circumferential direction by disc spinning means. The control module 22 also controls the output of laser light from the writing laser 20, by turning on and off the writing laser 20 in a suitable pattern.

The laser light emitted by the writing laser 20 strikes the upper-most of the coloured layers (i.e. the coloured layer in closest proximity to the writing laser—initially this would be the white layer 19a) of the label writing layer 18 at a location directly beneath the writing laser 20. The material of the white layer 19a directly beneath the writing laser 20 absorbs the energy of the laser beam and, upon absorbing a sufficient amount of energy, vaporises forming a hole 23 of the same diameter as the illuminating laser beam. The coloured layer beneath the upper-most layer (in this case the magenta layer 19b) is then exposed to the laser beam via the hole 23 in the white layer 19a. Once the area of the magenta layer 19b illuminated by the laser beam has absorbed enough energy from the laser beam, it too will be vaporised exposing the coloured layer beneath (i.e. the yellow layer 19c) and the process will continue.

The colour sensor 21 monitors the colour of the area of the label writing layer 18 directly beneath the writing laser 20. The colour of this area, as seen by the colour sensor 21 will progress through the respective colours of the coloured layers 19a, 19b, 19c, 19d (i.e. from white to magenta, from magenta to yellow, then from yellow to cyan) as each coloured layer is exposed through the hole 23 vaporised in the coloured layer above. When the colour sensor 21 detects that the desired colour has been produced, i.e. that the writing laser 20 has vaporised a hole 23 through sufficient of the covering coloured layers 19a, 19b, 19c, 19d to expose the desired coloured layer, it will generate a signal to the control module 22 which will de-energise the writing laser 20 and instruct the positioning mechanism to move the write head to the next writing position.

Alternative Embodiments

In addition to the variants mentioned above, other variants are envisaged as falling within the scope of the invention. For example, the optical disc 1 may be a multi-layer disc, such that the data writing layer and the label writing layer are on the same side of the disc and are independently addressable by the optical drive in the first embodiment, the data writing means and laser writing print head in the second embodiment, or the laser writing heads in the third and fourth embodiments, respectively.

The skilled man will understand that the laser writing print head of the second embodiment, could be used in other devices rather than an optical drive. For example, the laser writing print head could be used in place of a standard print head in a standard printer. The laser generating devices 5a, 5b, 5 . . . n may be arranged in the same positions that impact pins would be on the print head of a standard impact printer, or in the same positions that the inkjet nozzles would be on the print head of a standard inkjet printer. In this alternative embodiment, the label writing layer 3b of the optical disc 1 would be replaced with a laser-reactive printing media 9. The laser-reactive printing media might have the dimensions of a standard sheet of paper but need not be limited in this respect. It will however, incorporate laser-reactive materials in a similar manner to that as discussed with reference to the label writing layer in the first and second embodiments. Images/patterns could be written in a manner similar to that described in relation to the second embodiment. In this case however, the laser writing print head is transported in a first direction by a print head transport system whilst the laser-reactive printing media would be transported, beneath the laser writing print head, and in a direction generally orthogonal to the direction of travel of the print head, by a suitable media transport mechanism.

A printer incorporating such a laser writing print head has several advantages over the prior art systems of laser marking. Firstly, the laser energy required to mark the laser-reactive printing media 9 is much less than in other laser marking systems due to the close proximity between the laser writing print head and the laser-reactive printing media 9. This also means that lower energy laser generating devices 5a, 5b, 5 . . . n can be used in the laser writing print head, providing savings in both energy and cost efficiencies. Since the layout of the laser generating devices 5a, 5b, 5 . . . n in the laser writing print head conforms to the placement of the pins in a standard impact printer or the ink nozzles in a standard inkjet printer, no bespoke software is required to operate the print head. Software instructions that are operable to control a standard impact or inkjet printer can be converted within the control module 8 into instructions that are suitable for controlling the laser writing print head to produce a similar output on the laser-reactive printing media 9 as a standard printer would on normal paper.

Although the second embodiment and further modifications discuss a laser writing print head having an array of laser generating devices 5a, 5b, 5 . . . n, the skilled man will appreciate that optical fibres could take the place of the individual laser generating devices 5a, 5b, 5 . . . n so that an open end of each fibre is arranged into an array. The other end of each optical fibre could be supplied with laser light from a single laser, via a suitable optical switching mechanism, so that laser light is emitted from the open end of the optical fibres onto the laser-reactive printing media in a suitable pattern.

The skilled person will also appreciate that the laser writing print head of the second embodiment (and the alternative variations of the same discussed above, e.g. a printer incorporating the laser writing print head) could be arranged to use the lasers and laser reactive media discussed in relation to the third and fourth embodiments. For example, the laser writing print head housing could contain two laser generating devices for each aperture in the housing. The outputs of each pair of lasers could be arranged to be heterodyned together and optically filtered so that only one of the discrete range of laser light frequencies so produced would leave the aperture in the housing and illuminate the laser reactive media. The laser reactive media would react to the specific frequency of light it receives, in positions corresponding to each aperture of the laser writing print head.

Alternatively, the laser writing print head of the second embodiment (and its variations mentioned above) could incorporate the laser and laser reactive materials of the fourth embodiment. The laser writing print head housing would contain a single laser and colour recognising sensor to operate through each laser aperture in the housing (although a single laser device could alternatively be used, supplying its laser light to each aperture via individual optic fibres in a similar manner as discussed above). The laser reactive media would be vaporised in a pattern corresponding to the pattern of the laser apertures in the laser writing print head housing. The colour produced by the vaporisation of the laser reactive media beneath an aperture would again be dependent on how far through the coloured layers the hole vaporised by each laser beam penetrated.

The first and second embodiments discuss discrete dots of several laser-reactive materials each turning a specific colour in response to being illuminated by laser light of one specific frequency. The skilled man will appreciate that, alternatively, a single laser-reactive material could be used that changes colour depending on the frequency or intensity of the laser light with which it is illuminated. Suitable laser generating devices, capable of adjusting the intensity of their output beam or the frequency of the laser light produced, could be used in conjunction with this material, using a method similar to that disclosed in relation to either the first or second embodiment. In this case, the laser-reactive material, would be spread evenly over the image writing layer of an optical disc or printing media and the image writing means of the first embodiment or the laser writing print head of the second embodiment could form images on the disc or media by illuminating the laser-reactive material with different frequencies, colours, and intensities of laser light. A suitable software application would convert data files corresponding to the images to be drawn into suitable instructions to the writing means, including information concerning frequency and intensity.

Referring to the variable optical filter 17 of the third embodiment, the skilled person will understand that a series of selectively controlled optical filters could be used. Alternatively, a series of optical filters, each one arranged to block a specific frequency of laser light could be incorporated in place of the variable optical filter 17. One or more of the series of optical filters could be moved into the optical path of the optical beam reflected from the mirror 15 in order to selectively filter the reflected beam.

The skilled person will also understand that the laser generating devices of the third embodiment need not be selectively energised. Instead, both of the laser generating devices may simply always be activated in unison, i.e. so that the variable optical filter 17 always receives a heterodyned optical signal. The variable optical filter 17 will filter out the undesired frequencies in the manner described above.

The skilled person wilt understand that any type of variable optical filter could be used in the third embodiment of the invention. For example, waveguides could be used to spatially separate the heterodyned optical signal into individual signals having discrete frequencies as discussed above. Any apparatus able to selectively block and unblock the transmission of these spatially separated optical signals could be used as part of the variable optical filter 17.

Although collimating and focussing assemblies have been described in relation to the third embodiment, the skilled person will appreciate that, depending on the laser beam dimensions, focussing may not be necessary and the laser beams can simply be directed.

Referring to the colour sensor of the third embodiment, rather than being used continuously to monitor the colour change of the laser reactive material, the colour sensor may be used only for calibration of the system. Calibration might involve calculating a time needed for a particular frequency of laser light to illuminate the laser reactive material before the associated colour change takes place. In this respect, during normal writing operation, the control module would cause the laser write head to illuminate a portion of the optical disc for the calculated time, dependent on the frequency of laser light being used at that specific time and location, before moving the write head to the next position.

A colour recognising sensor has been described in relation to the third and fourth embodiments. The skilled person will understand, however, that a colour recognising sensor might not be needed at all if the laser reactive material used in these embodiments were limited to a known type of material exhibiting a known reaction (e.g. colour change) in response to the laser light.

Referring to the optical disc of the fourth embodiment, the skilled person will appreciate that the description of the colours of the coloured layers 19a, 19b, 19c, 19d is merely illustrative and any arrangement of coloured layers could be used. In addition, the coloured layers could be any colour, different to those already mentioned. Rather than having a white coloured layer 19a uppermost on the surface of the optical disc, the uppermost layer could instead be black. Also, the laser reactive material of the coloured layers of the optical disc could incorporate particles that are adapted to absorb infra-red energy from the laser beam thereby aiding vaporisation of the laser reactive material. Additionally, the material of the coloured layers of the fourth embodiment may need to absorb different quantities of energy from the laser beam before they vaporise. In such a case, the laser writing head may be adapted to increase or decrease the power of the laser beam depending on the colour of the laser reactive material to be vaporised (as detected by the colour sensor).

The above embodiments illustrate, but do not limit, the present invention. Alternative embodiments which may occur to the skilled reader on reading the above description may also fall within the scope of the invention.

The invention claimed is:

1. An apparatus for writing an image to a laser reactive image medium, wherein the reaction of said laser reactive image medium is dependent on a frequency of laser light received, the apparatus being arranged to apply to said medium a laser beam having a selected one of a plurality of discrete frequencies, and to generate at least one of said plurality of discrete frequencies by heterodyning two others of said discrete frequencies.

2. The apparatus of claim 1, further comprising:
   a first laser, operable to output a first laser beam having a first frequency;
   a second laser, operable to output a second laser beam having a second frequency different to the first frequency;
   an assembly to direct the respective output beams of the first and second lasers at a coincident position; so as to generate
   a third frequency corresponding to the sum of the first and second frequencies, and
   a fourth frequency corresponding to the difference between the first and second frequencies; and
   a filter to selectively apply one or more of said first to fourth frequencies to said medium.

3. The apparatus of claim 2, wherein said assembly comprises a first lens operable to focus the output beam of the first laser at a first position and second lens operable to focus the output beam of the second laser at a coincident position to the first position.

4. The apparatus of claim 1, further comprising a sensor to monitoring the reaction of the laser reactive image medium being illuminated by the laser light.

5. The apparatus of claim 4, wherein the first and/or second laser is operable to be deactivated in response to the sensor detecting a predetermined reaction.

6. The apparatus of claim 1, wherein the reaction of the laser reactive image medium is a color change reaction.

7. The apparatus of claim 1, further comprising:
   a control module to receive one or more data files incorporating the image, wherein said apparatus is responsive to said one or more data files to write said image to said laser reactive image medium.

8. The apparatus of claim 1, wherein said laser reactive image medium comprises an optical disc.

9. A laser reactive image medium comprising laser reactive material able to change colour in reaction to being illuminated with laser light, and wherein the colour change so effected is dependent on the frequency of laser light illuminating the laser reactive material, wherein the laser reactive material is able to react by changing to:
   a first color if illuminated by laser light of a first frequency;
   a second color if illuminated by laser light of a second frequency; and
   a third color if illuminated by laser light having a frequency corresponding to the sum of the first and second frequencies.

10. The laser reactive image medium of claim 9, wherein the laser reactive material is able to react by changing to:
    a fourth color if illuminated by laser light having a frequency corresponding to difference between the first and second frequencies.

11. The laser reactive image medium of claim 9, wherein said laser reactive image medium comprises an optical disc.

12. The optical disc of claim 11, comprising a label side on which a visible image is writable by a laser of an optical disc drive, the label side having a format recognisable as a data writable side by the optical disc drive, wherein the label side comprises a layer of said laser reactive material.

13. The apparatus of claim 12, wherein the label side includes a track for tracking while data writing.

14. A method of writing an image to a laser reactive image medium, wherein the reaction of said medium is dependent on a frequency of laser light received, comprising:
applying to said medium a laser beam having a selected one of a plurality of discrete frequencies; and
generating at least one of said plurality of discrete frequencies by heterodyning two others of said discrete frequencies.

15. The method of claim 14, further comprising:
directing the respective output beams of a first laser, having a first frequency, and a second laser, having a second frequency, at a coincident position so as to generate
a third frequency corresponding to the sum of the first and second frequencies and a fourth frequency corresponding to the difference between the first and second frequencies; and
selectively applying one or more of said first to fourth frequencies to said medium.

16. The method of claim 14, further comprising:
monitoring the reaction of a portion of the laser reactive image medium illuminated by the applied laser light.

17. The method of claim 16, further comprising:
de-energising the first laser and/or the second laser when a predetermined reaction is detected.

18. The method of claim 14, wherein said laser reactive medium reacts to the applied laser light by changing to a different color, where the color change effected is dependent on the frequency of the applied laser light.

19. The method of claim 14, further comprising:
receiving one or more data files incorporating the image, and
writing the image to said laser reactive image medium in response to said receiving said one or more data files.

20. An apparatus for writing an image to a laser reactive image medium, comprising:
a laser generating device operable to selectively illuminate and vaporise at least one portion of said laser reactive image medium with a laser beam; and
a sensor to monitor a reaction of the at least one portion of the laser reactive image medium.

21. The apparatus of claim 20, further comprising:
a control module to receive one or more data files incorporating the image; wherein
said apparatus is responsive to said one or more data files to write said image to said laser reactive image medium.

22. The apparatus of claim 20, wherein the laser generating device is operable to be activated in response to said sensor detecting a first predetermined reaction and deactivated in response to the sensor detecting a second predetermined reaction.

23. The apparatus of claim 22, wherein said reaction of the at least one portion of the laser reactive image medium is a color change reaction.

24. The apparatus of claim 20, wherein said laser reactive image medium comprises an optical disc.

25. An optical drive for writing data to an optical disc and further arranged to write a label to the optical disc, comprising:
a print head operable to write a visible image to said optical disc;
wherein said print head comprises an array of laser generating devices operable to emit simultaneously said at least two beams of laser light.

26. The optical drive of claim 25, wherein the print head is controllable so as to vary the frequency and/or intensity of said at least two beams of laser light.

27. An optical drive for writing data to an optical disc and further arranged to write a label to the optical disc, comprising:
a print head operable to emit simultaneously at least two beams of laser light wherein said print head comprises a single laser generating device coupled to two or more optical fibers, wherein ends of the two or more optical fibers that are not attached to said laser generating device are arranged to form an array and to emit simultaneously said at least two beams of laser light.

28. A laser reactive image medium comprising a continuous layer of a laser reactive material able to change color in reaction to being illuminated with laser light, wherein the color change so effected is dependent on the frequency of laser light illuminating the laser reactive material, and wherein the laser reactive material is able to react by changing to:
a first color if illuminated by laser light of a first frequency;
a second color if illuminated by laser light of a second frequency; and
a third color if illuminated by laser light having a frequency corresponding to the sum of the first and second frequencies.

29. A laser reactive image medium comprising a continuous layer of a laser reactive material able to change colour in reaction to being illuminated with laser light, wherein the colour change so effected is dependent on the frequency of laser light illuminating the laser reactive material, and wherein the laser reactive material is able to react by changing to:
a first color if illuminated by laser light of a first frequency;
a second color if illuminated by laser light of a second frequency; and
a fourth color if illuminated by laser light having a frequency corresponding to the difference between the first and second frequencies.

* * * * *